US006592487B2

United States Patent
Gassmann

(10) Patent No.: US 6,592,487 B2
(45) Date of Patent: *Jul. 15, 2003

(54) TORQUE DISTRIBUTION DEVICE

(75) Inventor: Theodore Gassmann, Siegburg (DE)

(73) Assignee: GKN Automotive, Inc., Aurburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/845,921

(22) Filed: Apr. 30, 2001

(65) Prior Publication Data

US 2002/0006844 A1 Jan. 17, 2002

Related U.S. Application Data

(63) Continuation of application No. 09/492,988, filed on Jan. 27, 2002, now Pat. No. 6,296,590.

(51) Int. Cl.[7] .......................... F16H 48/00; F16H 48/20
(52) U.S. Cl. ................. 475/223; 475/231; 475/234; 180/248
(58) Field of Search ................. 475/223, 231, 475/233, 234, 235; 180/247, 248, 249; 74/650

(56) References Cited

U.S. PATENT DOCUMENTS

| | | | | |
|---|---|---|---|---|
| 4,914,980 A | * | 4/1990 | Taureg et al. | 475/89 |
| 5,279,401 A | * | 1/1994 | Stall | 192/52.4 |
| 5,326,333 A | * | 7/1994 | Niizawa et al. | 475/249 |
| 5,366,421 A | * | 11/1994 | Hirota | 475/231 |
| 5,370,588 A | * | 12/1994 | Sawase et al. | 475/84 |
| 5,533,424 A | * | 7/1996 | Mimura | 74/650 |
| 5,860,889 A | * | 1/1999 | Schlosser et al. | 475/221 |
| 6,059,680 A | * | 5/2000 | Yoshioka | 475/88 |
| 6,095,276 A | * | 8/2000 | Kuroda et al. | 180/247 |
| 6,296,590 B1 | * | 10/2001 | Gassmann | 475/231 |

* cited by examiner

Primary Examiner—Sherry Estremsky
Assistant Examiner—Tisha D. Lewis
(74) Attorney, Agent, or Firm—Mick A. Nylander

(57) ABSTRACT

A differential drive that includes a rotatably driven differential housing supported in a housing. The differential drive further includes a differential gear set arranged and supported in the differential housing. The differential drive also includes a torque distribution device adjacent to a differential gear set. The torque distribution device connects a differential side shaft gear with one side shaft. The torque distribution device is arranged to control the torque between a front axle and a rear axle of a motor vehicle.

11 Claims, 7 Drawing Sheets

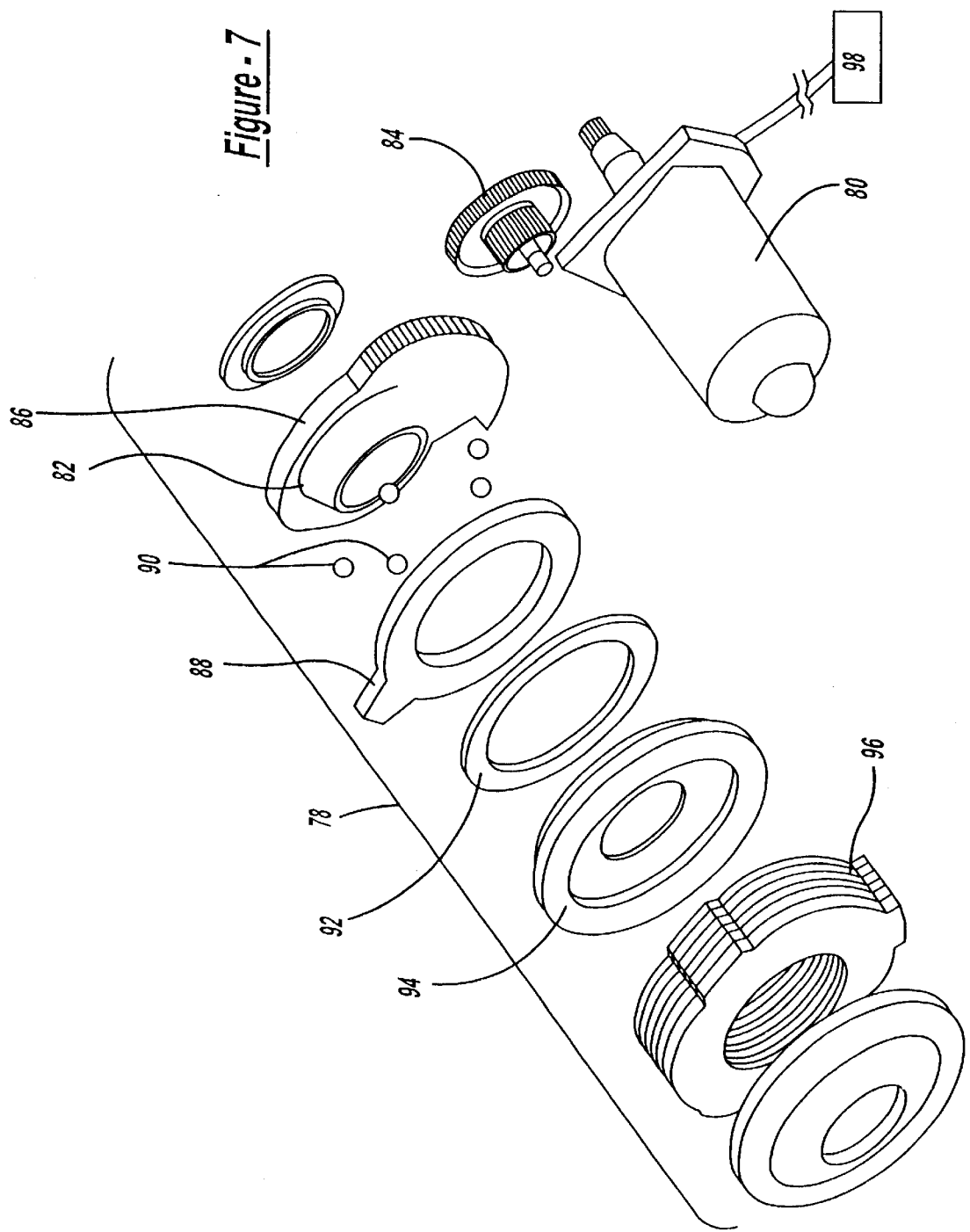

TORQUE DISTRIBUTION DEVICE

This application is a continuation of Ser. No. 09/492,988 filed Jan. 27, 2000, now U.S. Pat. No. 6,296,590.

BACKGROUND OF THE INVENTION

1. Field of the Invention

The present invention relates to differential drives for a motor vehicle, and more particularly, relates to an active torque transfer device for use in a vehicle.

2. Description of Related Art

The differential drive is well known in the motor vehicle industry. The differential drive is used in conjunction with the transmission and drive shaft or propeller shaft (prop shaft) to turn the automotive vehicle wheels at different speeds when the vehicle is going around a curve, to differentiate the speed of each wheel individually and to provide the proper amount of torque to each wheel in slipping, turning, or other road to wheel conditions.

In a traditional torque on demand drive train layout of an automotive vehicle there is a primary driven front/rear axle and a secondary driven "hang on" axle that is connected via a prop shaft or drive shaft and a torque transfer coupling to the primary driven axle. The torque transfer coupling is usually directly in front of the secondary driven axle. The axle differential creates the division of power (or torque) to each side shaft of the axle. The primary driven axle also includes a differential which divides necessary power to the side shaft of each front axle and then the wheels. The division of torque between the front and rear axle is completed by the torque transfer coupling which is a separate unit on the drive train system and requires space for its housing and other related parts. A current state of the art torque transfer coupling for an automotive vehicle is located between the primary and secondary driven axles of the vehicle and, generally consists of a friction clutch pack which is loaded via a ball ramp mechanism. The ball ramp mechanism is engaged by an electric motor. An electronic control unit senses slip conditions of the wheels, monitors current driving conditions of the vehicle and applies a current to the electric motor which will engage the clutch via the ball ramp mechanism and distribute torque to each wheel as necessary.

An active torque transfer system provides maximum flexibility in the distribution of torque between the axles of an all wheel or four wheel drive automotive system. A similar system can be used in applying torque within an axle on a side to side basis between a left rear wheel and a right rear wheel. Other devices currently used in the art for active torque transfer include electromagnetically engaged pilot clutch to drive a ball ramp mechanism. This mechanism loads the main clutch via electromagnetically engaged pilot clutches. Most of the systems use the same ball ramp mechanism but use different engagement mechanisms to engage the ball ramp mechanism to the clutch unit. All of these active torque drive systems are located in a separate housing usually directly in front of the rear (differential in most cases.

Therefore, there is a need in the art for a device to simplify and reduce the weight and required space of an active torque distribution device for use in an automotive vehicle.

SUMMARY OF THE INVENTION

One object of the present invention is to provide an improved torque distribution device.

Another object of the present invention is to provide a torque distribution device that includes a clutch pack that runs at axle speed, which will reduce imbalance issues to the transaxle.

Yet a further object of the present invention is to reduce the packaging requirement in the propeller shaft area of the automotive vehicle.

Still another object of the present invention is to provide a differential that does not require a separate oil housing for a clutch pack, but also reduces or minimizes the effort for the bearings and seals.

A further object of the present invention is to reduce the number of interfaces in the drive train while also reducing the weight and cost of the drive train assembly.

Still a further object of the present invention is to integrate within the existing axle housing the engagement mechanism needed to control the torque between the front and rear axles.

Still a further object of the present invention is to combine the front to rear and side to side locking features of a drive train system within one system unit.

To achieve the foregoing objects the differential drive for use on a vehicle includes a rotatably driven differential housing supported in an axle housing. A differential gear set arranged and supported in the differential housing. A torque distribution device adjacent to the differential gear set. The torque distribution device connects one differential side shaft gear with one side shaft. The torque distribution device is arranged to control the torque between a front axle and a rear axle of the automotive vehicle.

One advantage of the present invention is a new and improved torque distribution device for a vehicle.

A further advantage of the present invention is that the torque distribution device uses a clutch pack that runs with axle speed which reduces imbalance issues throughout the transaxle.

A further advantage of the present invention is the reduced packaging requirement in the prop shaft area of the drive train system.

Still a further advantage of the present invention is the inclusion of the clutch pack within the housing of the differential thus requiring no separate oil housing and also reducing the effort for bearings and seals while improving the cooling of the clutch pack.

Another advantage of the present invention is the reduced number of interfaces within the drive train system and the reduced weight and costs of distributing torque to the drive train system.

A further advantage of the present invention is the integration within the axle housing of the engagement mechanism for the torque distribution device.

A further advantage of the present invention is the combination of front to rear and side to side locking control features within one system.

Other objects, features, and advantages of the present invention will become apparent from the subsequent description and appended claims taken in conjunction with the accompanying drawings.

BRIEF DESCRIPTION OF THE DRAWINGS

FIG. 7 shows an exploded view of the engagement mechanism used in the present invention.

BEST MODE OF CARRYING OUT THE INVENTION AND DESCRIPTION OF THE PREFERRED EMBODIMENT(S)

Figure 1:
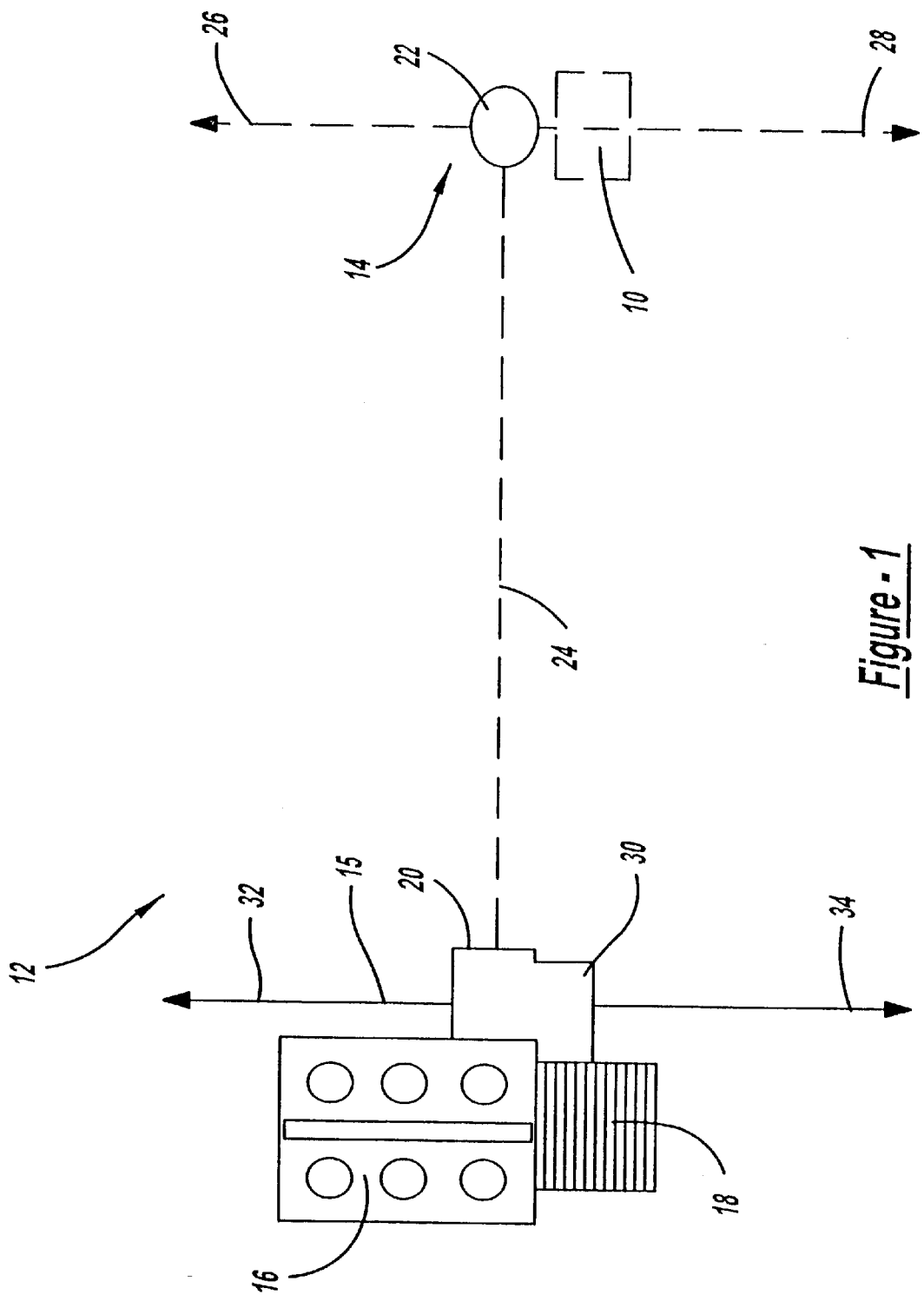
FIG. 1 shows a schematic view of a vehicle system according to the present invention.

Referring to the drawings, a torque distribution device 10 according to the present invention is shown. FIG. 1 schematically illustrates an all wheel drive or four wheel drive motor vehicle 12 that is a primary front wheel driven vehicle, however, the present invention can be used on a primary rear wheel driven vehicle as well.

The motor vehicle 12 as shown in FIG. 1 is primarily driven by a front axle 15. The motor vehicle 12 is an all wheel or four wheel drive vehicle and is driven by power transferred from the engine 16 through a transaxle or gear box 18 which may be either automatic or a manual gear box, into the power take off 20 of the drive train assembly and finally on through to the first differential 30 and when demanded to the rear differential 22 via a propeller shaft or driving shaft 24, which transfers power to the rear differential 22. At the rear differential 22 power is split to a left hand rear side shaft 26 and a right hand rear side shaft 28 for distribution to the wheels at the rear of the vehicle. The front differential 30 controls power and slip or spin from the left hand front side shaft 32 and the right hand front side shaft 34. In an all wheel drive vehicle power is delivered to both the rear differential 22 and the front differential 30 via a distributing drive, but either the front axle 15 or rear axle 14 is the primary driven axle, with the other axle only receiving most of the power when needed. The preferred embodiment of the present invention is an all wheel drive vehicle wherein the torque distribution device 10 is located within the rear differential 22 and acts from there to distribute torque to the front and rear axles of the vehicle.

Figure 2:
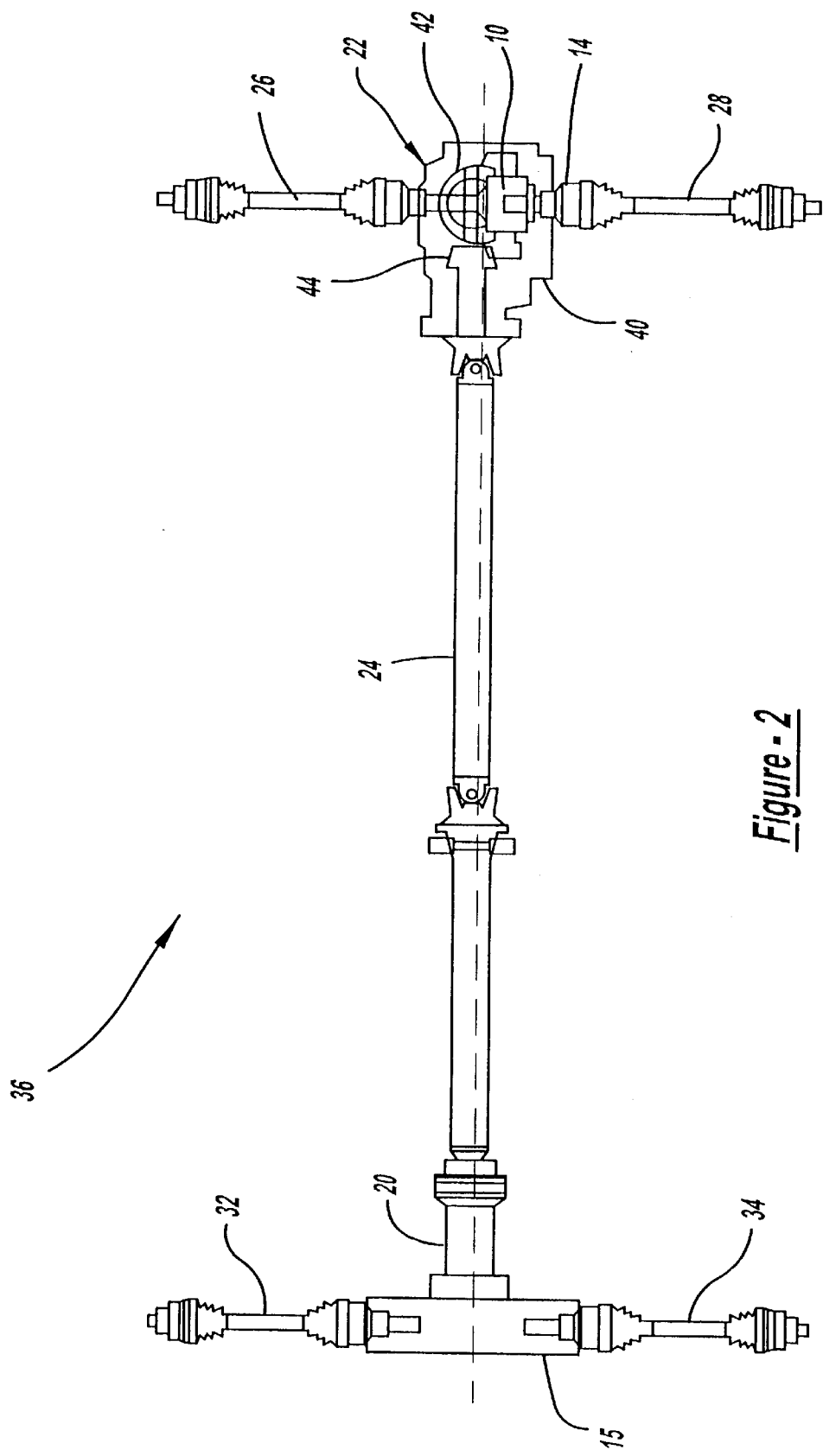
FIG. 2 shows a schematic view of a vehicle drive train system according to the present invention.

FIG. 2 shows the drive train 36 of an all wheel drive vehicle. The drive train 36 includes a front axle 15 which includes the left hand front side shaft 32 and the right hand front side shaft 34. The propeller shaft or drive shaft 24 transmits power from the power take off 20 to the rear differential 22. The rear differential 22 has a left hand rear side shaft 26 and a right hand rear side shaft 28 extending therefrom to the vehicle wheels which will drive the vehicle in a forward or reverse motion. The rear differential drive 20 includes an axle housing 40 in which a differential housing 42 is rotatably supported around a rotational axis. The differential housing 42 is driven by the vehicle gear box via a driving gear 44. The torque distribution device 10 of the current invention is located within the differential housing 40 and is used to actively transfer torque between the front axle 15 and the rear axle 14 as shown in FIG. 2. The use of the torque distribution device 10 within the differential drive 22 in conjunction with an open differential 42 will reduce the weight and cost of the car by removing the need of a torque transfer coupling which is usually located directly in front of the rear differential drive. The incorporation of the torque transfer device 10 within the differential drive 22 greatly reduces the space required on the undercarriage of the car leaving more space for exhaust and fuel tank needs.

Figure 3A:
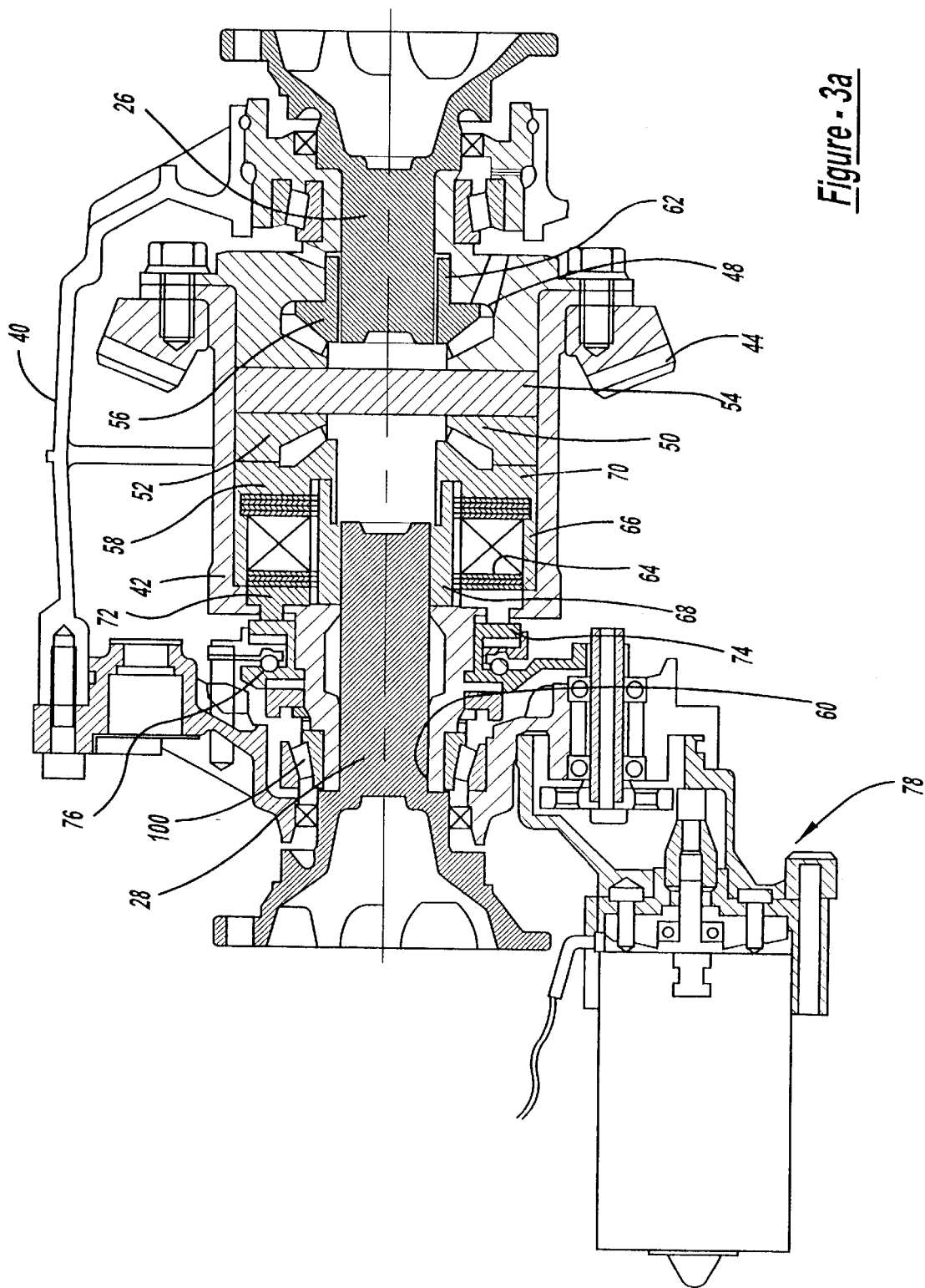
FIG. 3A shows a cross section through a differential drive according to the present invention.
Figure 3B:
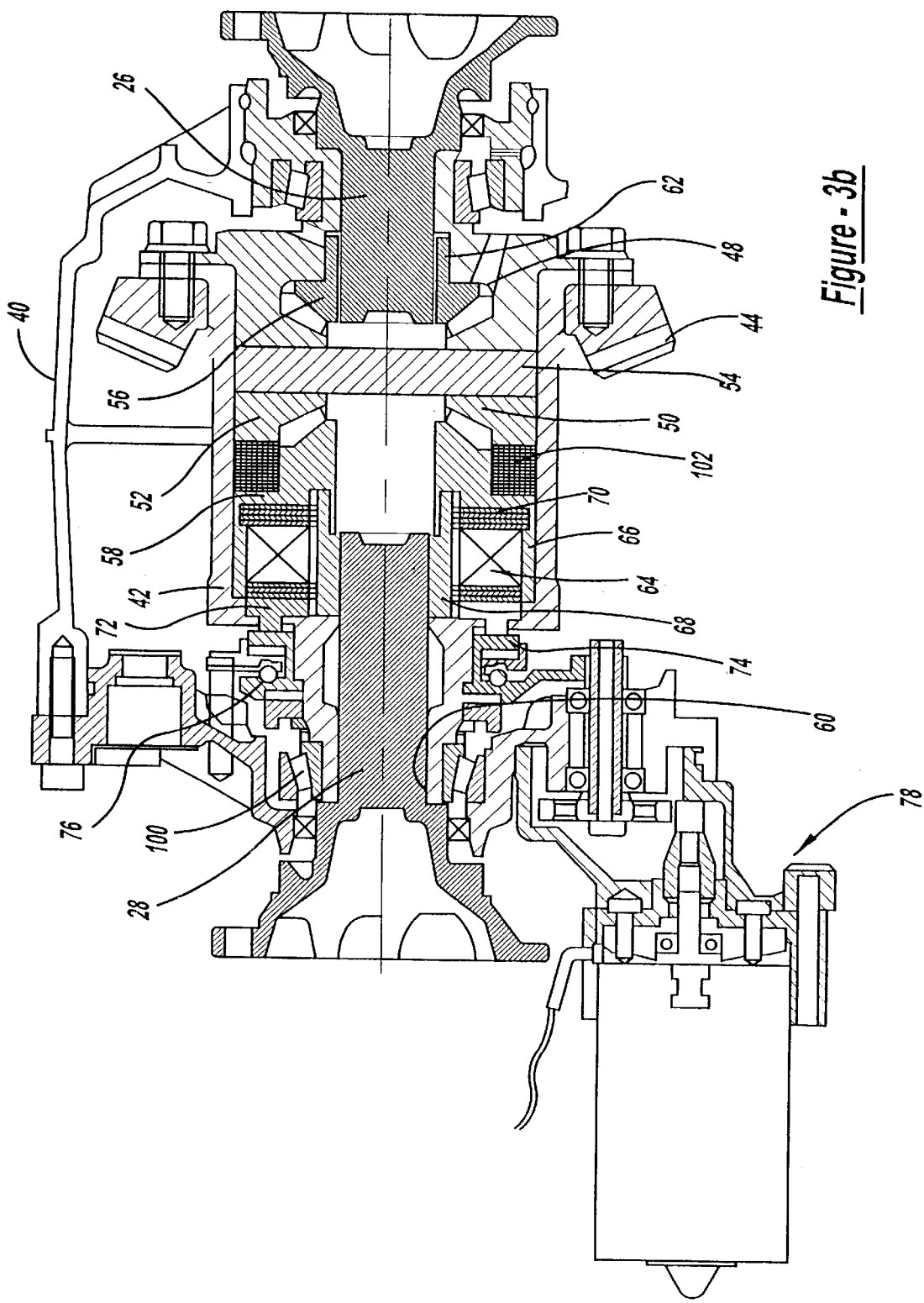
FIG. 3B shows a cross section through a differential drive including an optional second clutch pack according to the present invention.

FIGS. 3A and 3B show a cross section of the differential drive 22 which includes the axle housing 40 which rotatably supports the differential housing 42 around a rotational axis. Within the differential housing 42, a differential gear set 48 is rotatably arranged and supported. In the preferred embodiment the differential gear set 48 is a standard bevel ore planetary set. This gear set 48 generally includes two differential bevel gears 50, 52 that are rotatably arranged on a bearing pin 54 which axis forms a rotational axis for the two differential bevel gears 50, 52. The rotational axis for the differential bevel gears or differential gears 50, 52 will intersect the rotational axis for the differential side shaft gears 56, 58 within the differential housing 42. The differential housing 42 includes two differential side shaft gears 56, 58 that are arranged around a rotational axis as to be rotatable relative to the differential housing 42. The differential side shaft or side shaft gears 56, 58 are rotatably received in bores 60 of the differential housing 42. The side shaft gears are supported against the interfaces of the differential housing 42 with supporting discs 62 arranged therebetween. The axis of rotation of the side shaft gears 56, 58 and the axis of rotation of the differential gears 50, 52 intersect each other at a right angle. The propeller shaft or drive shaft 24 engages the differential housing 42 via a driving gear 44.

The torque distribution device 10 is located within the differential housing 42 and engages the differential gear set 48. The torque distribution device 10 will connect one of the differential side shaft gears 58 with one of the side shafts 28. The torque distribution device 10 includes a clutch pack 64 which in the preferred embodiment is a friction clutch pack as shown in FIG. 3A. The friction clutch pack 64 includes a first end housing (outer face) 66 and an inner hub 68 to which friction plates 70 are attached in an alternating fashion so as to overlap with each other. A pressure ring 72 engages one end of the friction pack clutch 64 and will provide the engagement onto the clutch to control the torque between the one side shaft gear 58 and one side shaft 28. The pressure ring 72 is activated by a pin 74 and spring 76 combination which is in turn controlled by an engagement mechanism 78 as shown in FIG. 7.

The engagement mechanism 78 is a ball ramp type mechanism which is engaged by an electric motor 80. As shown in FIG. 7 an electric motor 80 includes reduction gearing 84 which transmits forces through an expander disc 82. The expander disc 82 includes a plurality of circumferential extending grooves 86. Connected to the expander disc 82 is a pressure disc 88 which has expander balls 90 with ball ramps placed there between, such that the expander balls 90 are disposed one in each of the extending grooves 86. Engaging the pressure disc 88 on a side opposite the expander disc 82 is a thrust race ring 92. A pressure ring 94 which connects through to the friction discs 96 of the expander mechanism 78. An electronic control unit 98 is connected to the electric motor 80 and also connected to the wheels of the vehicle. The electronic control unit 98 monitors the driving conditions being encountered by the vehicle and will sense any slip conditions or other driving conditions and apply a current to the electronic motor 80 based on reactions to the slip conditions sensed in the wheels. The expansion of the expansion mechanism will engage the pin 74 and spring 76 which will depress the pressure ring 72 and engage the clutch pack 64 which is in contact with the vehicle side shaft gear 58 and side shaft 28.

As shown in FIG. 3A the differential gear set 48 will take the speed difference between the front and rear driven axle and between the left and right hand wheels of the secondary driven or rear axle at the same time. This all occurs while the clutch pack 64 is running at the same speed as the axle speed and providing the torque transfer to one side shaft 28 and then onto a wheel. The second side gear shaft 56 and the connected side shaft 26 and wheel, is then driven with the same torque via the open differential. Therefore, the differential acts as an open differential between the left and right side shafts of the axle allowing the wheels to spin freely. FIG. 3A shows the engagement mechanism, which is a ball ramp mechanism in our preferred embodiment, attached to the differential case 42 and therefore causes no added load on the bearings 100 of the differential drive. The torque distribution device 10 as described above controls the slip between the front and rear axles of the automotive vehicle by controlling one of the side shafts 28 of the secondary driven axle. This removes the need for a separate torque transfer coupling which is generally located directly in the prop shaft usually in front of the rear differential drive. As shown in FIG. 3B it should also be noted that within the differential housing 42 is located a second set of friction plates that are engaged between the side shaft gear 58 and the differential housing 42 which will provide additional side to side locking control between the right hand wheel and the left hand wheel of the side shaft, respectively. Therefore, the torque distribution device 10 as described above including the second clutch pack or friction plates 102 can combine and control both front to rear and side to side locking effects. The locking effects controlled between the front to rear and side to side by the torque distribution device 10 can be set up in a ratio such that you can tulle the device 10 by adjusting the number of friction plates used for each function, i.e., front to rear torque control and side to side torque or locking effect control.

Figure 4:
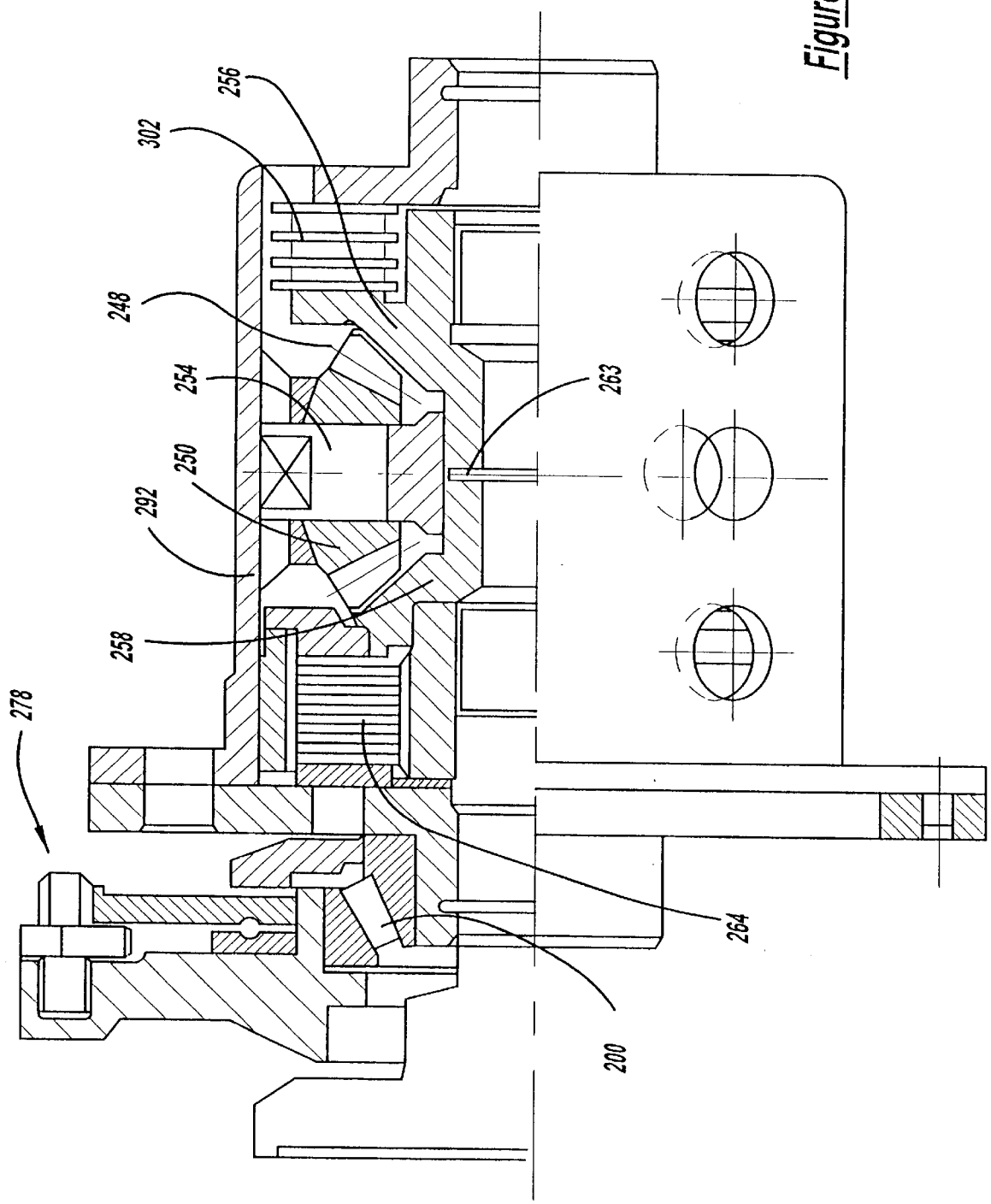
FIG. 4 shows an alternate embodiment in partial cross section of the present invention.

FIG. 4 shows an alternate embodiment of the present invention wherein the engagement mechanism 278 is located within the axle housing in which case the right hand taper bearing 200 is loaded with the engagement force of the motor and ball ramp engagement mechanism 278. The ball ramp engagement mechanism 278 works the same way as described above. As shown in FIG. 4 the differential gear set 248 is rotatably mounted within the differential housing 242. The differential bevel gears 250 are mounted on a smaller bearing pin 254 and are in contact with the differential side shaft gears 256, 258. Positioned between the side shaft gears 256, 258 is located a thrust bearing 263 to keep the side shaft gears 256, 258 from rubbing against each other causing unwanted noise. The reduced pin differential gear sets 248 have at least two differential gears 250, 252 but may have more depending on the design of the differential housing 242. The differential gear 250 is allowed to move small amounts to adjust to the interaction between the side shaft gears 256, 258 and the differential gears 250, 252. The clutch pack 284 is arranged in the same manner as found in the above embodiment. The second clutch pack 302 which is used to control side to side spinning and torque on the axle is engaged between the side shaft gear 256 and the differential housing 242.

Figure 6:
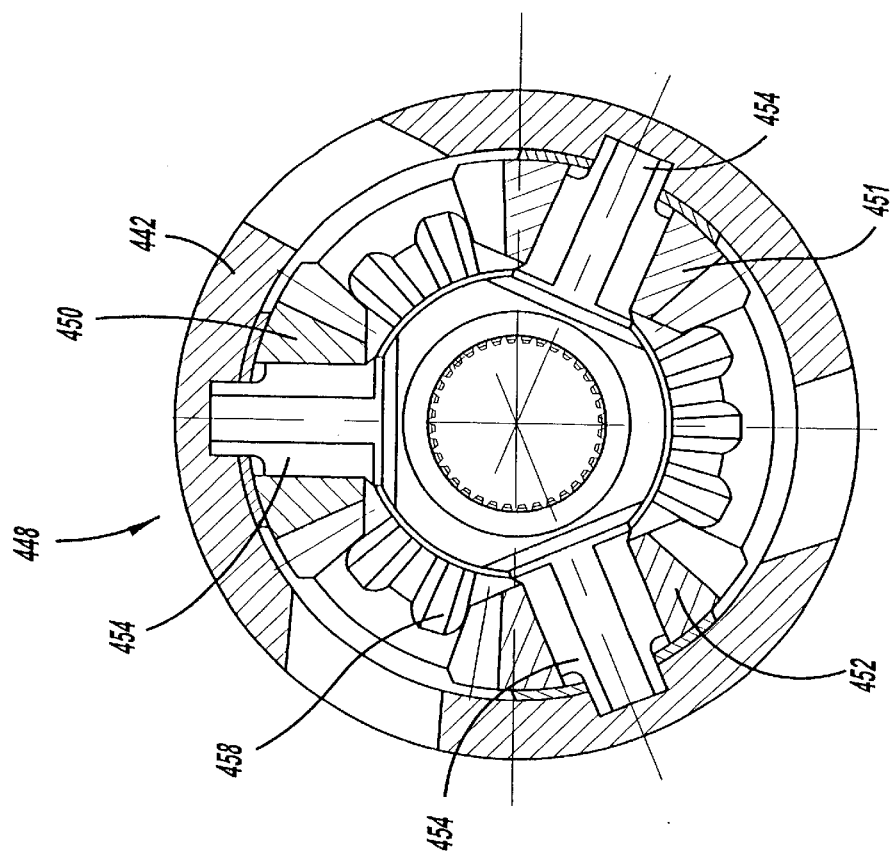
FIG. 6 shows a cross section of an alternate embodiment of a three pinion differential.
Figure 5:
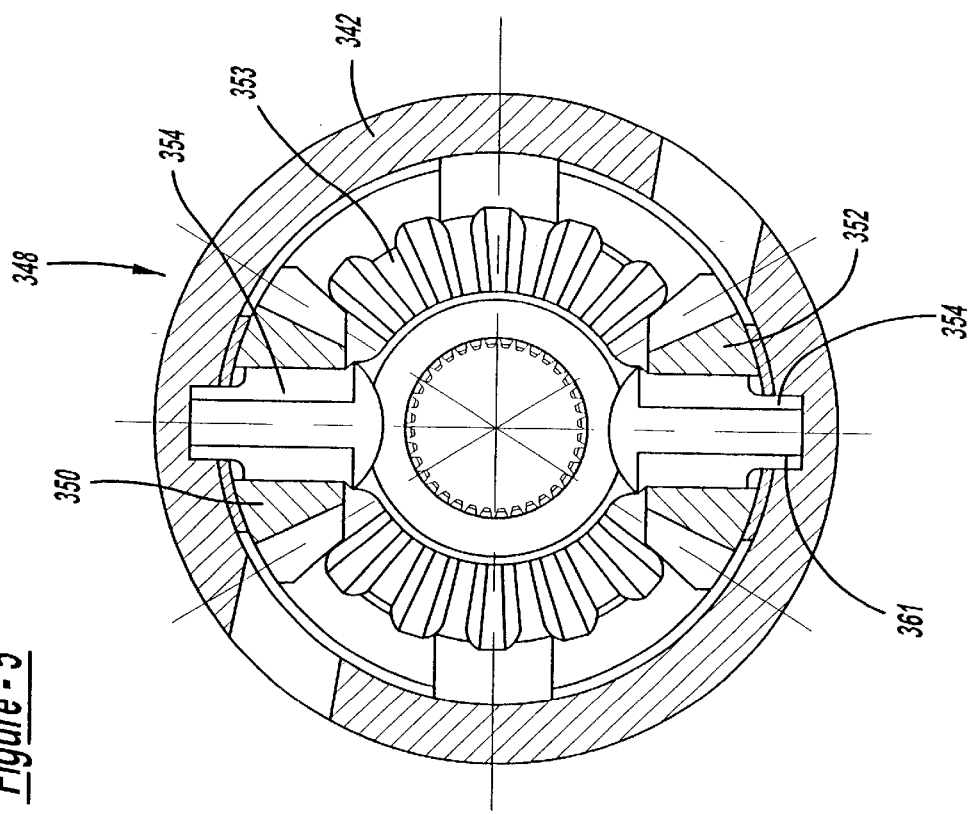
FIG. 5 shows a cross section of a two pinion differential.

FIG. 5 and FIG. 6 show cross sections of the differential gear set 248 as described in the embodiment shown in FIG. 4. FIG. 5 shows the two pin differential gear set 348. The two pin differential gear at 348 includes two differential gears 350, 352 connected to the reduced bearing pin 354. A side shaft gear 358 is in rotatable engagement with the differential gears 350, 352. The bearing pins 354 are secured within a notch 361 of the differential housing 342. FIG. 6 discloses the three pin differential gear set 448. The three pin differential gear set 448 includes three differential gears 450, 451, 452 connected to reduced bearing pins 454. A side shaft gear 458 is rotatably engaged with the differential gears 450, 451, 452. The bearing pins 454 are secured within a notch 461 of the differential housing 442 wall.

The improved torque distribution device 10 as described above creates several advantages over the prior art including the clutch pack running with and at axle speed which will reduce imbalance issues within the drive train system. The minimized packaging requirement in the prop shaft or drive shaft area also increases room needed for exhaust and fuel tank purposes. There is no separate oil housing necessary for the clutch pack as it is built within the differential housing and the lubricant used within the differential housing 42 is also used for the clutch pack 64. The device 10 reduces the effort needed for bearings and seals by being incorporated in the differential housing 42. This also will improve cooling of the torque distribution device 10 by using the same lubricant or oil as found in differential drives. The combination and inclusion of the torque distribution device 10 within the differential drive 22 also reduces the number of interfaces needed from the differential drive 22 to the power distribution portion of the drive train assembly. There is a reduction in weight because a torque transfer coupling and housing is no longer necessary and this also reduces costs by tooling fewer parts. Furthermore, the engagement mechanism whether it is a ball ramp mechanism or any other type of mechanism such as electromagnetically engaged pilot clutches, etc., may be integrated directly into the differential drive 22. Furthermore, the combination of both front to rear axle control and right wheel to left wheel spin control in one unit greatly reduces the complexity of the drive train system.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise then as specifically described.

What is claimed is:

1. A differential drive for use on a vehicle, said drive including:

a rotatably driven differential housing supported in a housing;

a differential gear set arranged and supported in a housing;

a torque distribution device adjacent to said differential gear set, said torque distribution device connects one of a differential side shaft gear with a side shaft, said torque distribution device includes a clutch pack, said clutch pack having a plurality of friction plates rotatably fixed with respect to said side shaft and a plurality of friction plates rotatably fixed with respect to one of said differential side shaft gears, said torque distribution device arranged to control torque between a front axle and a rear axle of the vehicle;

a second side shaft gear being driven with said same torque via said differential gear set; and a second clutch pack engaged with said second side shaft gear and said differential housing.

2. The differential drive of claim 1 wherein said differential gear set includes two side shaft gears arranged and supported in said differential housing.

3. The differential drive of claim 2 wherein said differential gear set further includes at least two differential gears which engage said side shaft gears and are rotatably supported in said differential housing.

4. The differential drive of claim 1 wherein said differential gear set obtains a speed difference between said front and rear axle and between a left and a right wheel of said rear axle at a predetermined time.

5. The differential drive of claim 1 wherein a differential gear operates between said first and said second side shaft gears, said differential gear allows vehicle wheels to spin freely.

6. The differential drive of claim 1 wherein said second clutch pack provides a side to side locking function.

7. The differential drive of claim 1 further including a third plurality of friction plates adjoining said side shaft gear and said differential housing to create a side to side locking effect.

8. The differential drive of claim 1 wherein said torque distribution device combines front to rear and side to side locking features.

9. An improved torque distribution device for use on a vehicle drive train system, having an engine, a transaxle, a front and rear differential, a propeller shaft connecting the front and rear differential, a right and left side shaft extending from each of the front and rear differentials, said improved torque distribution device comprising:

the rear differential having a differential gear set, said torque distribution device engaged with said differential gear set within a rear differential housing;

said torque distribution device including a friction clutch pack engaged with one of a side shaft gear and a side shaft, said torque distribution device includes a clutch pack, said clutch pack having a plurality of friction plates rotatably of fixed with respect to said side shaft and said clutch pack having a plurality of friction plates rotatably fixed with respect to one of said side shaft gears, said clutch pack runs with axle speed and provides torque transfer between said front and rear differential; and a second clutch pack in contact with side shaft gear and said rear differential housing, said second clutch pack provides a locking function to the left and right side shafts of the rear differential.

10. The torque distribution device of claim 9 combining a front to rear and left to right side shaft locking features in a single unit.

11. A method of controlling the transfer of torque between a front and rear axle of a vehicle, said method including the steps of:

locating a torque distribution device adjacent to a differential gear set in a differential housing;

controlling said torque distribution device with a ball ramp mechanism and a motor;

connecting one of a differential side shaft gear to a side shaft via a clutch arrangement; and controlling torque transfer between the front and rear axles by said differential side shaft gear.

* * * * *

UNITED STATES PATENT AND TRADEMARK OFFICE
CERTIFICATE OF CORRECTION

PATENT NO.    : 6,592,487 B2
DATED         : July 15, 2003
INVENTOR(S)   : Theodor Gassmann It is certified that error appears in the above-identified patent and that said Letters Patent is hereby corrected as shown below:

<u>Column 1,</u>
Line 59, delete "("

<u>Column 2,</u>
Line 25, after the word "set", insert -- is --

<u>Column 4,</u>
Line 56, delete "which"

<u>Column 5,</u>
Line 33, delete "tulle" and insert -- tune --

Signed and Sealed this

Sixteenth Day of December, 2003

JAMES E. ROGAN
*Director of the United States Patent and Trademark Office*